(12) United States Patent
Abdul Raheem Ahmed

(10) Patent No.: US 7,053,818 B1
(45) Date of Patent: May 30, 2006

(54) METHOD FOR SIMPLE AND MULTIPURPOSE TRACKING

(76) Inventor: Waleed Bahaa El Deen Abdul Raheem Ahmed, P.O. Box 271201, Riyadh 11352 (SA)

( * ) Notice: Subject to any disclaimer, the term of this patent is extended or adjusted under 35 U.S.C. 154(b) by 293 days.

(21) Appl. No.: 10/248,162

(22) Filed: Dec. 22, 2002

(51) Int. Cl.
*G01S 13/42* (2006.01)
*G01S 13/30* (2006.01)

(52) U.S. Cl. ............ 342/109; 342/125; 342/135; 342/137

(58) Field of Classification Search ............ 342/107, 342/109, 125, 134, 135, 136, 139, 142, 146, 342/137
See application file for complete search history.

(56) References Cited

U.S. PATENT DOCUMENTS

| | | | | |
|---|---|---|---|---|
| 3,611,379 A | * | 10/1971 | Deckett | 342/125 |
| 4,249,176 A | * | 2/1981 | Oishi et al. | 342/125 |
| 4,620,788 A | * | 11/1986 | Giger | 342/135 |
| 5,095,312 A | * | 3/1992 | Jehle et al. | 342/88 |
| 5,194,869 A | * | 3/1993 | Kochiyama et al. | 342/125 |
| 6,111,536 A | * | 8/2000 | Richards et al. | 342/125 |
| 2004/0119633 A1 | * | 6/2004 | Oswald et al. | 342/70 |

* cited by examiner

*Primary Examiner*—Ian Lobo

(57) ABSTRACT

A method for measuring distance and relative speed between two points, one of which is stationary. The method employs a radio signal modulating a periodic pulse train sent from stationary point to a movable point and simultaneously being retransmitted back to the stationary point with both the transmission and the retransmission occurring during exactly the same period of time. The number of pulses sent from the stationary point during that period of time is known. The number of pulses received by the stationary point during the transmission period, being less than all of the pulses sent to the movable point is used to determine the distance. The process is repeated after a precise time period of no transmissions and a new distance is between the points is determined. Knowing the change in distance and the precise time period over which the change occurred, permits a determination of relative speed of the two points.

1 Claim, 4 Drawing Sheets

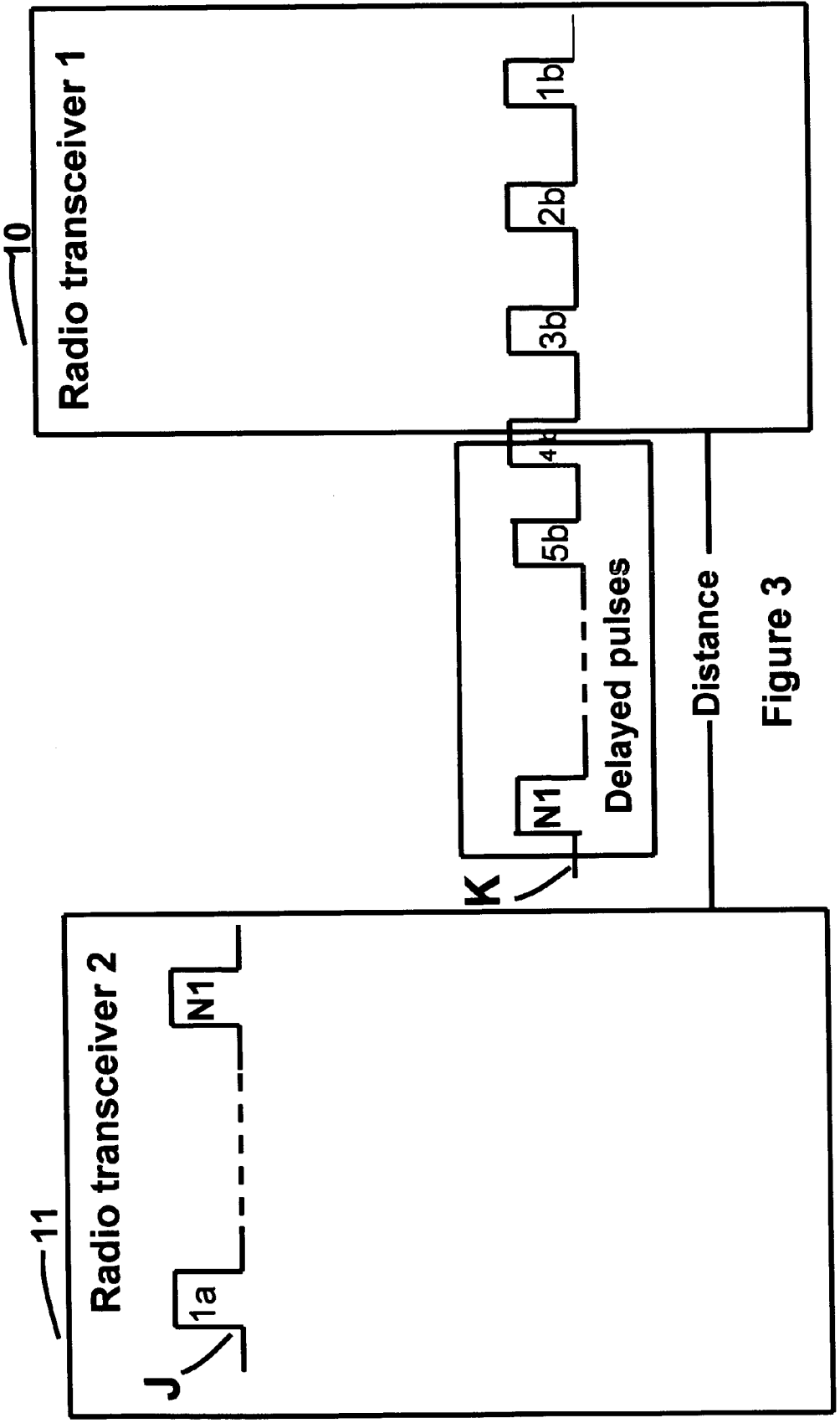

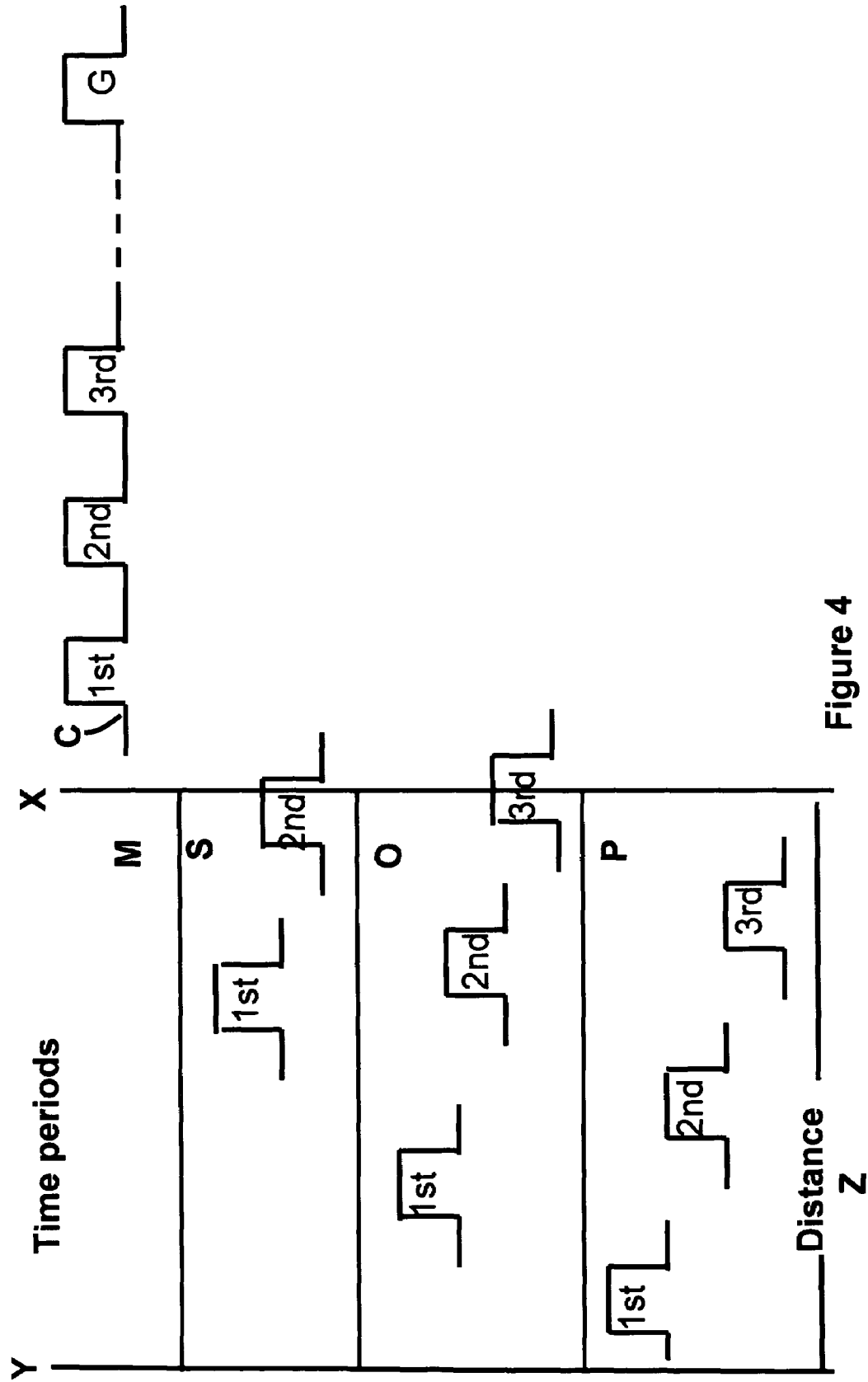

METHOD FOR SIMPLE AND MULTIPURPOSE TRACKING

FIELD OF INVENTION

In the field of distance and speed measurement, a process for measuring distance and speed employing radio waves.

DESCRIPTION OF PRIOR ART

The state of the art in distance and speed tracking systems are exemplified by expensive technology employing a complicated principle based on measuring the delay time in arrival of a radio wave transmitted from one point to another. The existing state of the art is further encumbered by being difficult for an ordinary person to use.

Often, existing tracking systems need access to a computer, central units, and Internet access. A common deficiency is that they suffer from limitations in accuracy.

The state of the art in distance measurement by radio waves is often distinguished by the means for determining the time interval between sending a radio pulse to a receiving point and receiving the echo, or retransmitted signal, from the receiving point back at the sending point. The prior art is replete with examples of methods using different techniques to stimulate a clock when sending a radio pulse and stopping the clock when receiving its echo or retransmitted signal.

It is an object of the present invention to simplify the means to calculate both the distance between two points and the relative speed of those two points with respect to each other.

The present invention describes a method for using a periodic pulse train directly as a time scale, in which each pulse is considered to correspond to a precise fraction of a time. Application of this method is expected to provide greater accuracy in distance and speed determinations than is otherwise possible with the state of the art.

It is an object of the present invention to simplify the method of measuring distance and speed, making the process easy to employ without sacrificing performance and capability.

It is an object of the present invention to empower multipurpose utilization of distance and speed measurement. For example, to enable use of the process to locate stolen cars, children, elderly patients, animals, or trucks in the normal course of business. Other applications may involve telemetry, for example when combined with mobile phones to enable distance and location determination for rescue operations.

It is, therefore, an object of this invention to employ a unique and more accurate method for measuring distance between two points and measuring the relative speed of those two points and to do so with a minimal required hardware.

Further objects and advantages of the present invention will become apparent from a consideration of the drawings and ensuing description.

BRIEF SUMMARY OF THE INVENTION

A method for measuring distance and relative speed between two points, one of which is stationary. The method employs a radio signal modulating a periodic pulse train sent from an immobile point to a movable point and simultaneously being retransmitted back to the immobile point with both the transmission and the retransmission occurring during exactly the same period of time. The number of pulses sent from the immobile point during that period of time is known. The number of pulses received by the immobile point during the transmission period, being less than all of the pulses sent to the movable point is used to determine the distance. The process is repeated after a precise time period of no transmissions and a new distance is between the points is determined. Knowing the change in distance and the precise time period over which the change occurred, permits a determination of relative speed of the two points.

BRIEF DESCRIPTION OF THE DRAWINGS

FIG. 3 illustrates missing pulses not received in the process.

FIG. 4 describes the overall process of the invention

DETAILED DESCRIPTION OF THE INVENTION

The drawings depict the preferred embodiment of the invention. The claimed invention will now be described in greater detail with reference to the figures.

The claimed invention is a new and simple method for measuring the distance and relative speed between two points, at least one of which is stationary.

Figure 1:
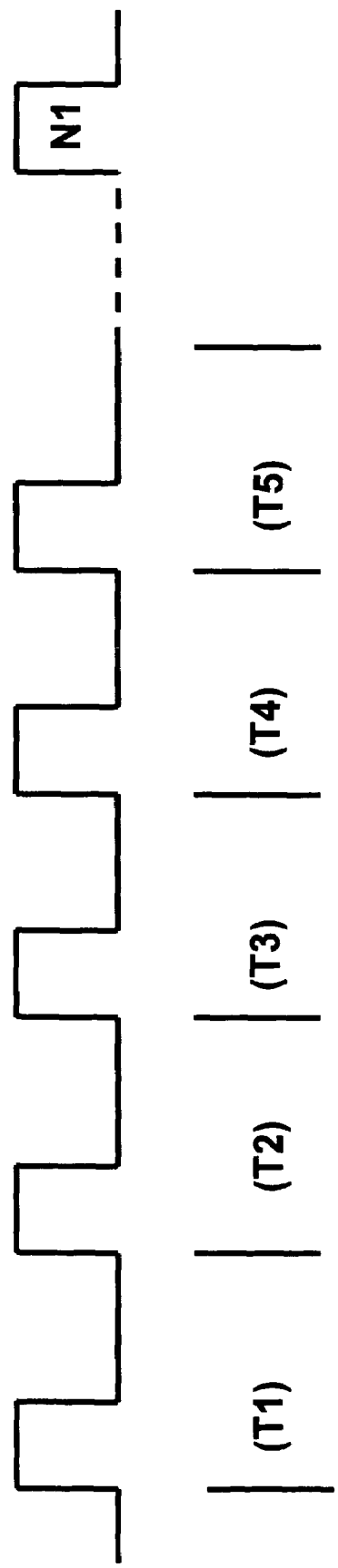
FIG. 1 illustrates a periodic digital waveform pulse train having a known number of pulses.

Referring to FIG. 1, a pulse train is first generated. A pulse train is a series of equal duration digital waveform pulses, which is generated over a precise and specific period of time. Each digital waveform pulse is generated over a precise fraction of the specific time period. That fraction of the specific time is shown in FIG. 1 by the capital letter T. To illustrate the concept, FIG. 1 shows the time period for each waveform by the letter T followed by a number, e.g., T1 for the first time period and TN1 for the last, which represents the duration of first digital waveform pulse. FIG. 1 shows that all of the individual time periods for each of the waveforms are equal to each other. FIG. 1 also shows that the rate at which each pulse is repeated is the frequency of the waveform, represented by the lower case letter, f. The frequency of the pulse train and time period are related by the equation: $f=1/T$ and $T=1/f$.

Figure 2:
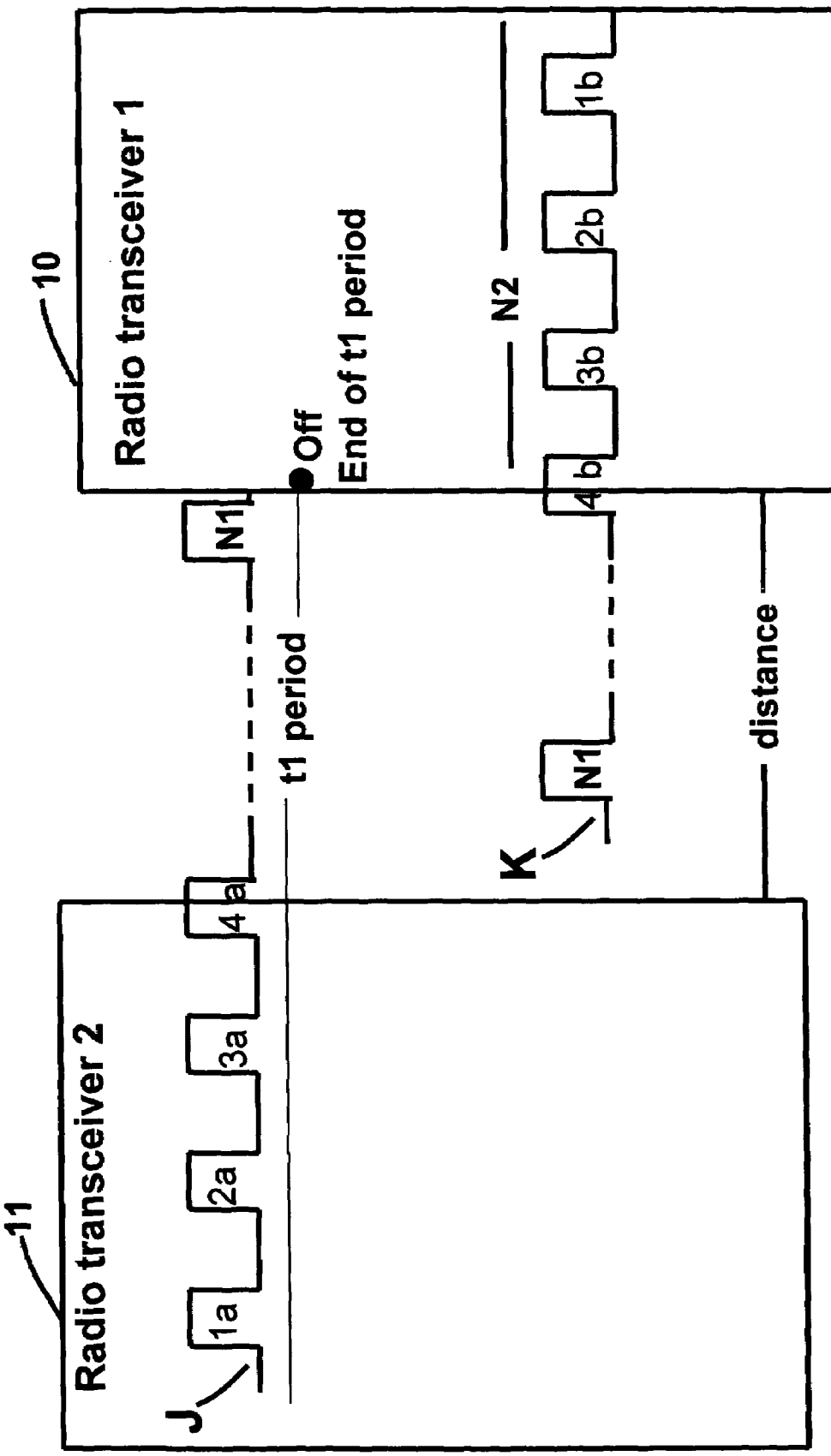
FIG. 2 identifies a time period when a no pulses can be received.

Referring to FIG. 2, it can be seen how distance is determined by measuring the number of missing pulses. Periodic pulse train, J, is transmitted from radio transceiver 1 (10) during a period of time, t1, which is the precise and specific period of time required to send all the pulses in pulse train J.

Radio transceiver 2 (11) receives periodic pulse train J and retransmits an identical periodic pulse train, K, back to radio transceiver 1 (10). Essentially, radio transceiver 2 (11) acts as a mirror to reflect the coming pulse train J. Radio transceiver 1 (10) sends the pulse train J and simultaneously receives part of the retransmitted pulse train K.

Radio transceiver 1 (10) is able to receive as much of the retransmitted periodic pulse train, K, as is possible during the precise and specific period of time during which radio transceiver 1 is also transmitting periodic pulse train J. Sending and receiving at radio transceiver 1 occur simultaneously during the exactly the same precise and specific period of time. When radio transceiver 1 (10) stops sending the last pulse in pulse train J, radio transceiver 1 (10) then also stops receiving the return pulse train K being sent from radio transceiver 2 (11). Radio transceiver 1 is turned off when it completes sending the last pulse in the train J. Therefore, pulse train J has N1 pulses and the received number of pulses in pulse train K is N2, where N2 is necessarily less than N1. FIG. 2 shows the missing pulses actually received at radio transceiver 1 as those pulses to the right of the left of the box containing radio transceiver 1 (10). Since the number of missed pulses is then known and the time per pulse is known, the distance between the two transceivers is the product of these two quantities.

Referring to FIG. 3, the concept of missed pulses, also known as delayed pulses, can be explained. Radio transceiver 2 (11) receives all of pulse train J sent from radio transceiver 1.

Radio transceiver 2 (11) thereupon retransmits a new radio signal, K, containing exactly the same number of pulses as sent by, and received from, radio transceiver 1 (10) in pulse train J.

However, radio transceiver 1 is only capable of receiving that part of the retransmitted radio signal K as is possible while radio transceiver 1 (10) remains on. Radio transceiver 1 remains on only as long as required to transmit pulse train J. So, radio transceiver 1 (10) receives only a part of the retransmitted pulse train K.

The part retransmitted pulse train K that is not received at radio transceiver 1 (10) is calculated and used to determine the distance between the two radio transceivers. Referring to the figure, it can be seen that the pulse train effectively covers the distance between the two radio transceivers twice, once in pulse train J and the second time in pulse train K. Thus, the distance between the two radio transceivers is calculated by dividing the number of missed pulses by two to obtain the average number of pulses traveling one way between the two transceivers.

It can thus be seen that the number of missed pulses is directly proportional to the distance between the two transceivers. It also logically follows that the number of missed pulses necessarily increases when the distance between the two radio transceivers increases. It also follows that when the distance between the two radio transceiver diminishes, so too will the number of missed pulses.

Referring to FIG. 4, it can be seen how repeating periodic pulse trains used in the invention permit the determination of distance between two points and their relative speed. FIG. 4 shows a periodic pulse train, C, with G digital waveform pulses. If pulse train C travels from point X to point y, it will travel a distance, Z.

To simplify an example, if one assumes that the time required to send the entire train by a first radio transceiver is one second, then a first pulse train needs a traveling time to reach from point x to point y, which is defined as the main traveling time, and the second pulse will be transmitted after the first pulse by a time fraction needed to generate the first pulse. Since the pulse train is periodic and the time required to send the entire train is assumed to be one second, then each digital waveform pulse in the pulse train will require a time determined by the formula, $T=1/G$ sec. Thus, the second digital waveform pulse will be transmitted after the first pulse a time equal to $2 \times 1/G$. Similarly, the third pulse will occur after the first pulse by a longer time fraction equal to $3 \times 1/G$, and so on. The general equation for the transmission start time for any digital waveform pulse in a periodic pulse train is the pulse's number from the start of the pulse train multiplied by 1/G sec.

It is further observed that if a periodic pulse train, for example C, is sent from point x to point y by a radio transceiver, which is turned off just after sending the last pulse in the pulse train, and if the pulse train is retransmitted at point Y by using a second radio transceiver sending to the first radio transceiver, then there must be a part of the retransmitted pulse train that cannot be received by the first radio transceiver. The missing part of the pulse train is due to two conditions: that the first radio transceiver is turned off after sending the last pulse in the train C, and that there is necessarily a period of time between the first pulse in the pulse train and the last pulse in the pulse train. These conditions require that the number of missed pulses (not received by the first radio transceiver) is a direct function of delay time and so also is a direct function of the distance between the two radio transceivers.

The process is used to determine the relative speed of between the two transceivers. In the method of the invention, the time between the periodic pulse trains is a rest time, t2, which is needed to enable a speed determination. During the rest time, any change in distance between the two transceivers will be determined in via the next transmission of a periodic pulse train. If such a change exists between the two readings, then the change divided by the rest time, yields a relative speed.

EXAMPLE

A one second periodic pulse train of 100 KHz contains 100,000 pulses. The 1-second transmission time is referred to as t1. Radio transceiver A (a stationary radio transceiver) sends the 1-second periodic pulse train to radio transceiver B (a movable radio transceiver). While receiving the 1-second pulse train, radio transceiver B simultaneously retransmits to radio transceiver A the same periodic pulse train. Radio transceiver A begins to simultaneously receive the periodic pulse train while sending the 1-second periodic pulse train to radio transceiver B. Radio transceiver A then turns off for a predetermined rest time period, t2, immediately after sending the last pulse, pulse number 100,000, in the 1-second pulse train. Turning off also terminates the reception of the periodic pulse train from radio transceiver B.

In this example, suppose that the distance between the two radio transceivers is known to be 50 kilometers (km), then the pulse train is sent from Radio transceiver A to Radio transceiver B, and is then retransmitted at the Radio transceiver B to Radio transceiver A. In this example, the first pulse travels the distance between the Radio transceiver A to Radio transceiver B and back to Radio transceiver A, or a total distance of 100 km.

The time required for any object, including a radio wave, to travel a distance is given by the equation: Time=Distance Divided By Speed. Therefore, the pulse train requires a time to travel the round trip distance equaling 100 km divided by the radio wave propagation velocity, which is 300,000 km/sec. So the first pulse needs $100/300,000=0.00033$ second to travel twice the distance between the two points. The result, 0.00033, is the main traveling time for each pulse in the pulse train.

Since there are 100,000 pulses in the pulse train in this example, each pulse in the pulse train represents $1/10^5$ second. This means that the second pulse in the pulse train will be sent by the radio transceiver A at a time equal to $2 \times 1/10^5$ seconds=0.00002 seconds after the first pulse. The second pulse, thus, needs $0.00002+0.00033=0.00035$ seconds to cover the distance between the two transceivers twice. The third pulse needs $0.00003+0.0003=0.00063$ seconds to cover this distance, and so on. In accordance with the formula described above, pulse number 99,967 is delayed from the first pulse by $99{,}967 \times 1/10^5$ seconds=0.99967 seconds. This delay effectively means that this pulse will leave radio transceiver A after the first pulse by 0.99967 second. This in turn means that this pulse requires 0.99967 seconds plus the main traveling time to cover this distance. This equates to 0.00033+0.99967=1 second. The very next pulse (pulse number 99,968) needs 1.00001 seconds, so the radio transceiver A will be turned off and will not be able to receive it.

In this example, the number of missed pulses is equal to 100,000 minus 99,967, which equals 33 pulses. Therefore, the average number of missed pulses in a single trip between the two transceivers is 33/2=16.5 pulses. The delay time is then calculated to be 16.5 pulses times 1 pulse per $1/10^5$ seconds equals 0.000165 seconds. Thus, the calculated distance between the two points given by the equation time× radio wave propagation velocity, is equal to 300,000 km/second times 0.000165 seconds=49.5 km.

Because an arbitrarily small number of pulses was included in this example for simplicity, the result is a rough estimation of the given distance. It should be clear that by increasing the frequency, or the number of pulses in a pulse train, the accuracy of the distance determination could be greatly enhanced.

The example is further illustrative of the method of determining relative speed. After the 1-second transmission period in this example, (generally referred to a the t1 period), radio transceiver A (the stationary radio transceiver) is switched off for the rest period, t2. After the rest period, radio transceiver A is then switched on again for another t1 period to repeat the steps for the next distance determination. The second distance determination, D2, will yield a different distance if the radio transceivers have moved near or farther away from each other, that is, if the movable radio transceiver has moved closer or farther away from the stationary radio transceiver. The speed of the movable radio transceiver is defined by the equation, speed=(D1−D2)/t2. If the sign of the resulting speed is negative, this indicates that the mobile unit B has moved toward the stationary radio transceiver. If the sign of the resulting speed is positive, then this indicates that the mobile unit B has moved farther away from the stationary radio transceiver.

Pulse generators, timing circuits and counters to create a periodic digital pulse, control a radio transceiver for on and off periods, and count the number of missing pulses are well known in the art. Arithmetic logic circuits that permit calculating the delay time and distance between two points are also well known and mature technologies. The method employing their use in this unique combination of steps serves to create a simple multipurpose tracking method capable of being implemented with minimal hardware. It also lends itself to achieving superior accuracy in measuring distance and speed. The method is capable of a wide range of accuracies, but the greatest accuracies can be achieved simply by maximizing the number of pulses in a periodic pulse train transmitted by the stationary radio transceiver.

The description above and the examples noted are not intended to be the only embodiments of this invention and should not be construed as limiting the scope of the invention. These examples merely provide illustrations of some of the embodiments of this invention. Others will be obvious to those skilled in the art. Thus, the scope of the invention is determined by the appended claims and their legal equivalents rather than by the examples given.

I claim:

1. A method for determining the distance of a movable object from an immobile object and determining the speed of the movable object with respect to the immobile object comprising the steps of, (a) generating a pulse train at an immobile object at first location for a first fixed-period-of-time, wherein said pulse train is composed of a predetermined number of pulses having a known width and period;

(b) modulating the pulse train with a high frequency carrier radio wave during said first fixed-period-of-time;

(c) transmitting said high frequency carrier radio wave to a movable object at a second location during said first fixed-period-of-time;

(d) receiving said high frequency carrier radio wave at said movable object during said first fixed-period-of-time;

(e) demodulating said pulse train at said movable object while generating said pulse train during said first fixed-period-of-time;

(f) remodulating said pulse train at said movable object with a second high frequency carrier radio wave during said first fixed-period-of-time;

(g) transmitting said second high frequency carrier radio wave from said movable object to said immobile object during said first fixed-period-of-time, wherein said pulse train remains unchanged as to the number of pulses, pulse width and period;

(h) receiving at said immobile object that portion of said second high frequency carrier radio wave that can be received during said first fixed-period-of-time;

(i) demodulating the pulse train received at the immobile object in that portion of said second high frequency carrier radio wave;

(j) counting the number of pulses in the pulse train in that portion of said second high frequency carrier radio wave;

(k) determining the number of missing pulses from that portion of the pulse train in relation to the number of pulses generated in the first fixed-period-of time;

(l) dividing the number of missing pulses by two to obtain an average number of pulses traveling between the immobile object and the movable object;

(m) calculating the delay time by dividing said first fixed-period-of-time by the predetermined number of pulses and multiplying the result by said average number of pulses;

(n) determining a first distance between said immobile object and said movable object by multiplying said delay time by the radio wave propagation velocity;

(o) repeating steps (a) through (n) for a second fixed-period-of-time equal to the first fixed period of time to determine a second distance; and, (p) determining the speed of the movable object with respect to the immobile object by taking the difference between the first distance and the second distance and dividing the result by the time between the termination of the first fixed-period-of-time and the start of the second fixed-period-of-time.

* * * * *